Dec. 20, 1960 J. A. HENDERSON 2,965,884

MEMORY CIRCUIT

Original Filed March 30, 1953 4 Sheets-Sheet 1

INVENTOR.
J ALVIN HENDERSON

BY Gust & Irish

ATTORNEYS

INVENTOR.
J ALVIN HENDERSON
BY Gust & Irish
ATTORNEYS

MEMORY CIRCUIT

Original Filed March 30, 1953 4 Sheets-Sheet 3

INVENTOR.
J ALVIN HENDERSON
BY Gust & Irish
ATTORNEYS

Dec. 20, 1960 J A. HENDERSON 2,965,884

MEMORY CIRCUIT

Original Filed March 30, 1953 4 Sheets-Sheet 4

INVENTOR.
J ALVIN HENDERSON
BY Gust & Irish
ATTORNEYS

United States Patent Office 2,965,884

Patented Dec. 20, 1960

2,965,884

MEMORY CIRCUIT

J Alvin Henderson, Fort Wayne, Ind., assignor to International Telephone and Telegraph Corporation

Original application Mar. 30, 1953, Ser. No. 345,499, now Patent No. 2,875,372, dated Feb. 24, 1959. Divided and this application Mar. 31, 1958, Ser. No. 725,152

5 Claims. (Cl. 340—173)

This invention relates generally to electron storage tube systems and more particularly to a memory circuit for use with such systems adapted to determine the amplitude of a sweep voltage and to maintain that amplitude for a predetermined length of time. This application is a division of my co-pending application Serial No. 345,499, filed March 30, 1953, now Patent Number 2,875,372, issued February 24, 1959, and assigned to the assignee of the present application.

There is known in the art of electron discharge devices an electron storage tube wherein an electron or signal image may be recorded, stored for great lengths of time, and scanned repeatedly without appreciable loss of definition. The recording electrode of such a tube may be characterized as a screen or target upon which electron charge information may be recorded by suitable deflection of a cathode ray, and from which such information may later be "read" by similar deflection of the cathode ray. In "writing," the beam is modulated in accordance with the charge information desired to be recorded, and, in scanning, the same beam at a different potential level is trained on the recorded information and is thereby modulated in accordance with the information image, signal or intelligence pattern. This signal modulation is then fed into suitable amplifier and detector circuitry which transforms the energy into understandable intelligence.

In one particular type of storage tube, the storage screen may be provided with physical information elements numbering approximately 1,000,000 to each square inch of area, and the screen may have an area of considerable size. Therefore, it is apparent that in order to locate normally a given one of all the elemental areas would be an extremely difficult task, since the physical area of this elemental area is of such minute infinitesimal character. The accurate deflection of the beam to any given elemental area has been difficult to accomplish principally because the scanning or sweeping voltages and deflection fields used to position and to sweep the electron beam of the tube are not linear.

It is an object of my present invention to provide an improved memory circuit.

Another object of my invention is to provide an improved electrostatic memory circuit for use in signal storage devices and adapted to train precisely an electron beam on any one of a plurality of areas on the charge storage screen of the device for a suitable period of time.

A further object of this invention is to provide an improved electrostatic memory circuit for use in an electron storage tube system which will determine the amplitude of a sweep voltage and maintain the amplitude at a given value for a predetermined length of time.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Generally, the storage tube of this invention employs a storage screen electrode comprised of a metal backing provided with a plurality of tiny apertures and a non-conductive material coating the edges of the apertures so as to provide areas of metal backing between all of the areas of non-conductive material hereinafter characterized as "islands." The writing function is accomplished by scanning the "island" side of the metal backing, and the reading operation is accomplished by positioning the electron beam on the selected "islands."

Figure 1:
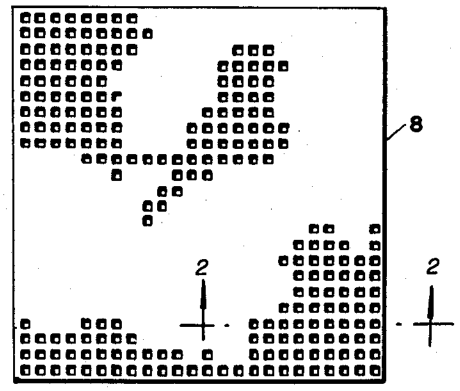
Fig. 1 is a front elevational view of one embodiment of a storage screen used in the present invention.
Figure 3:
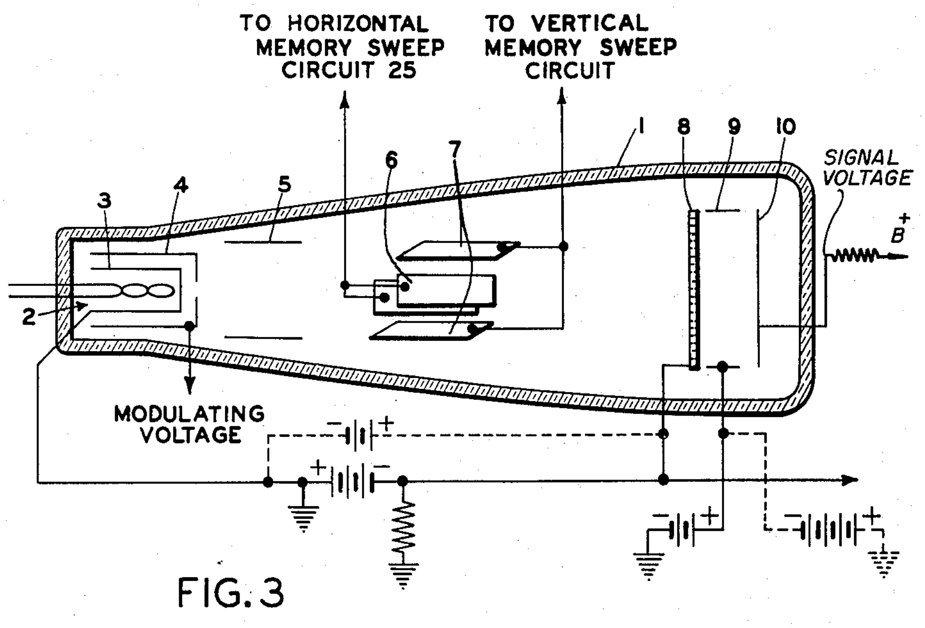
Fig. 3 is a graphic representation of a storage tube embodied in this invention.
Figure 2:
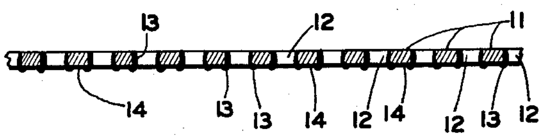
Fig. 2 is a fragmental section taken on section line 2—2 of Fig. 1.

Referring now to Figs. 1 to 3, the tube comprises an envelope 1 of glass, or the like, having an electron gun 2 which is used for the writing and reading functions. This gun 2 includes a cathode 3, a control grid 4, and a combination focusing and accelerating anode 5. Electrostatic deflection plates 6 and 7 arranged in pairs in space quadrature are positioned beyond the anode for controlling the deflection of the electron beam or cathode ray emitted from the gun 2. The storage screen 8 is positioned transversely in the tube 1 beyond the deflection plates 6 and 7, and an annular electron collector electrode 9 is spaced immediately beyond and adjacent to the screen 8. Next, a signal anode plate 10 is located immediately adjacent and beyond the electrode 9.

Referring to Figs. 1 and 2, the storage screen 8 consists of the metal backing 11 provided with equally spaced, tiny apertures 12, each aperture being about 0.0006 inch square. The marginal edges of each aperture 12 are coated with a suitable dielectric material having secondary emissive qualities, and this material may consist of any of the well known compositions such as calcium fluoride, barium fluoride, lithium fluoride, magnesium oxide, etc. This dielectric edging is more clearly shown in Fig. 2 by the reference numeral 13, which as stated previously, may be hereafter referred to as "islands" of information. The edge coating is so controlled as to leave spaces of exposed metal backing 11 between islands for a purpose which will be explained hereafter. Now it should be understood that while this storage screen has been described as having particular spaced conductive and non-conductive areas, this described arrangement is just one embodiment of this storage screen invention, and it will readily occur to a person skilled in the art that the same results achieved by the described storage screen may be obtained by other configurations wherein non-conductive, secondary emissive islands are separated by conductive areas. The importance of this concept will become apparent as the description proceeds.

Referring now to Fig. 3, the "writing" function is achieved by utilizing the simple circuit shown in dotted lines. In this circuit, the cathode 3 is slightly negative (by ten to twenty volts) with respect to the metal backing 11 of the storage screen 8, but is considerably positive with respect to the collector electrode 9. By modulating the grid 4 in accordance with the information to be impressed on the screen 8, the electron beam is caused to move about on the storage screen passing from one "island" element to another. Since the screen 8, as composed of both metal and insulator islands 13, is positive with respect to the cathode, the insulator island will collect the electrons from the directed beam such that these islands will charge toward the potential of the cathode. The number of the electrons in the beam will determine the eventual charge produced on the insulator for a given unit of time. Thus, by training the beam on different islands for different periods of times or by using modulation of the number of electrons in the beam, a charge pattern may be produced on the screen 8 which conforms to the intelligence or signal modulation impressed upon the grid 4.

During the writing time, the collector electrode 9 is made considerably negative, so as to prevent any electrons from passing through the apertures 12 and thereby interfering with the charge quantity directed toward the various insulator islands.

The circuit for reading is shown in full lines in Fig. 3. In this full line circuit, the cathode is positive with respect to the screen backing 11 and is negative with respect to the collector electrode 9. The insulator islands should be more negative than the cathode potential so that the written information will not be discharged. A positive potential is also applied to the signal plate 10 for the purpose of collecting all of the electrons emanating from the cathode 3.

Now, for an explanation of a single reading cycle, if we consider that a particular aperture or island has been selected for gathering information therefrom, the beam is directed through the aperture inside the island toward the signal plate 10. Since the charge on the island is more negative than the cathode, the beam will be modulated as it passes through the aperture and is thereafter collected by the signal plate 10. The modulation is then picked off the signal plate 10 in a conventional manner and interpreted in accordance with design preferences.

During the writing function, different islands on the screen are charged with different items of information. If a particular item of information is needed, it then becomes necessary to locate a particular island having that information. Since, as explained previously, these islands are located in minute spaced relation, a material problem is presented for locating accurately the island having the bit of information desired.

Figure 4:
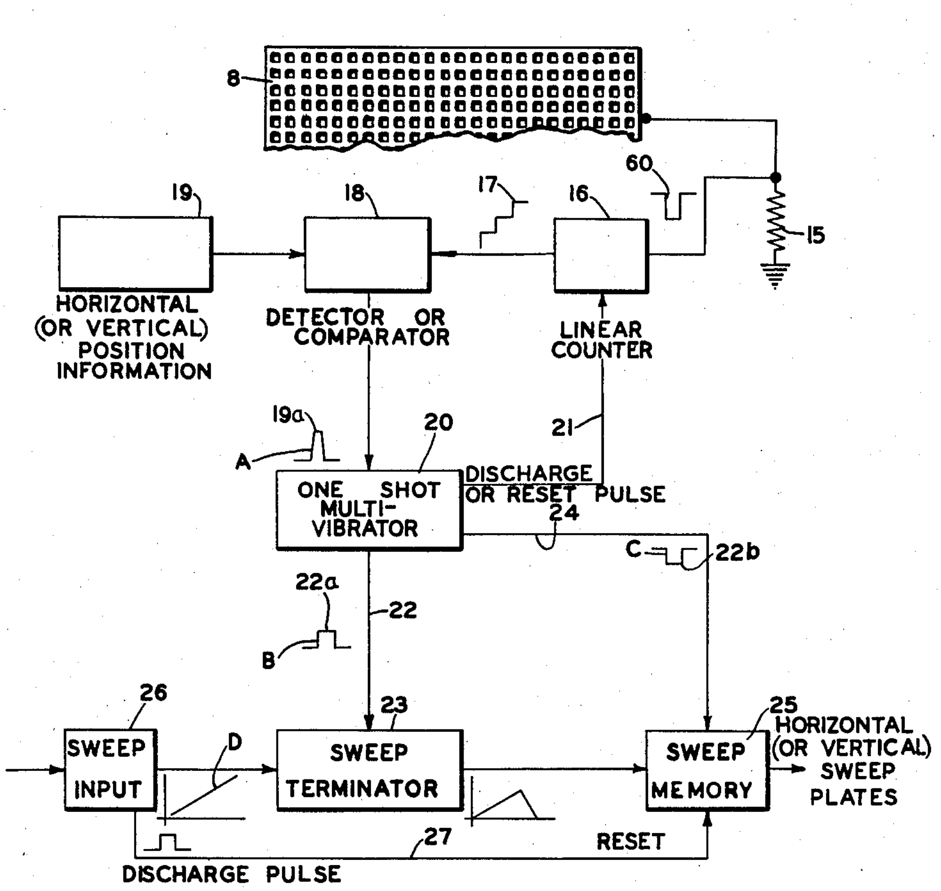
Fig. 4 is a block diagram of the circuitry of one embodiment of this invention.
Figure 8:
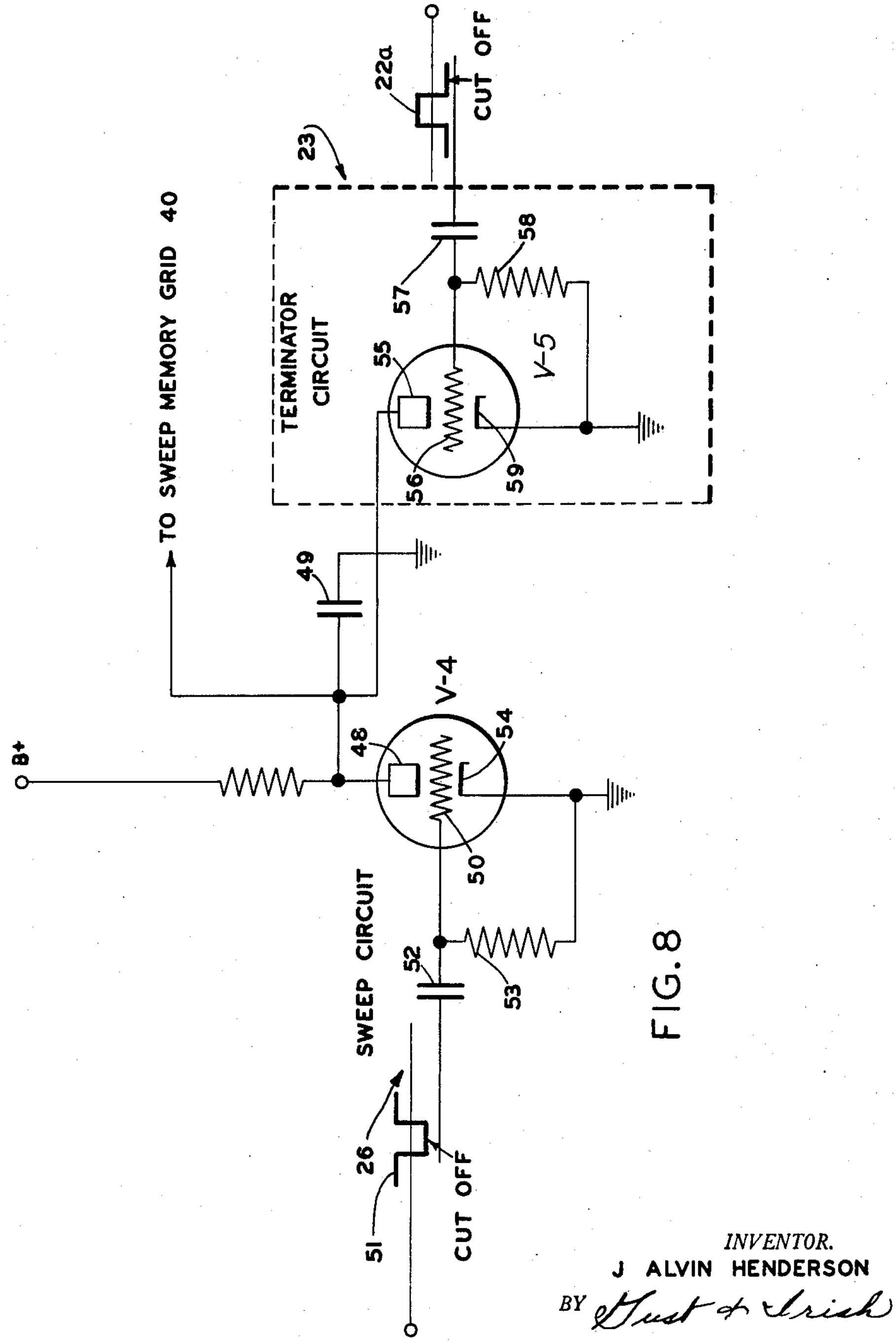
Fig. 8 is another diagram similar to Fig. 5 but of still another portion of the system of Fig. 4.

Now this information locating requirement may be accomplished by the circuit shown in block diagram in Fig. 4. In this circuit, the storage screen backing 11 is grounded through a resistance 15. The upper end of this resistance is coupled to a pulse counter 16, such as the one in Patent Number 2,583,003, which serves to produce a stepped voltage output shown by the wave form 17. This stepped output is then fed into a detector or comparator (see Fig. 5) which also has fed into its input horizontal (or vertical) positioning information from circuit 19 in the form of a selected value of direct current potential. The method of determining the exact value of direct current voltage will be explained hereafter. The output of the comparator 18, which is in the form of a triggering pulse 19*a* is fed into a trigger circuit, such as the one shot multivibrator 20 which provides three pulse outputs. One of these outputs is fed by a line 21 back into the linear counter 16 for discharging the latter upon completion of a count, another is fed by line 22 into a sweep terminator 23 (Fig. 8), and the third is fed by means of line 24 into a sweep memory circuit 25 (Fig. 6). A saw-tooth sweep input circuit 26 (Fig. 8) feeds the sweep terminator 23, and the latter in turn is coupled into the sweep memory circuit 25. A by-passing connection 27 is provided between sweep input circuit 26 and the sweep memory circuit 25 for a purpose which will be explained hereafter. The output of the sweep memory circuit is then coupled to the deflection plates of the tube 1.

Figure 5:
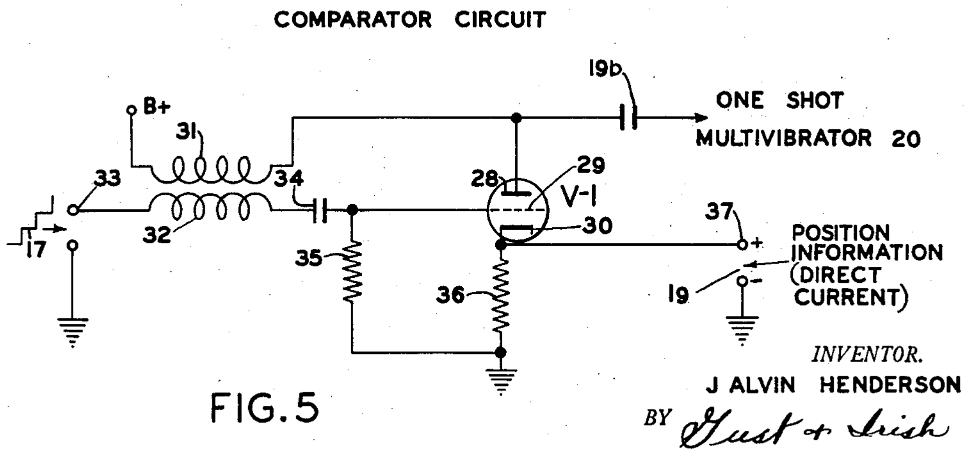
Fig. 5 is a circuit diagram of one portion of the circuit of Fig. 4.
Figure 6:
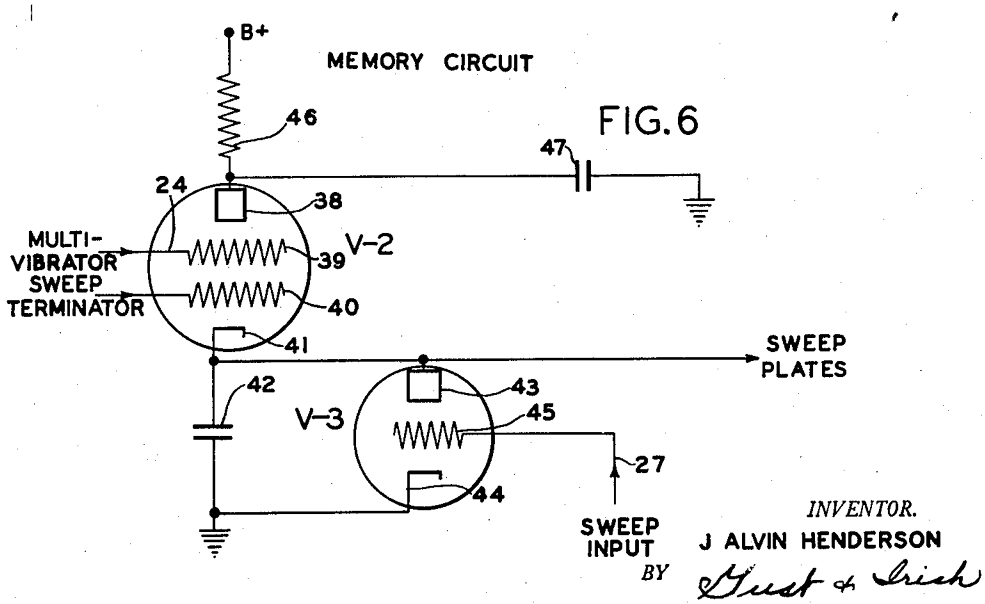
Fig. 6 is a diagram similar to Fig. 5 but of another portion of the circuit of Fig. 4.

One comparator circuit 18 which will operate satisfactorily in the aforedescribed block diagram is shown in Fig. 5. This circuit is essentially a locking oscillator which incorporates a triode V–1 having an anode 28, a control grid 29, and a cathode 30. In the anode circuit, there is connected a feedback coil 31 which leads to a B+ supply. This coil 31 is inductively coupled to a grid input coil 32 which is in turn connected to an input terminal 33 and to the grid 29 through a coupling capacitor 34. A resistor 35 is connected in the grid-cathode circuit to provide a negative bias for the grid. A biasing resistor 36 is connected between the cathode 30 and the ground. Also, connected to the cathode 30 is an input terminal 37 adapted to have connected thereto position information in the form of D.C. potential of selected value. A capacitor 19*b* is coupled to the anode 28 for the purpose of coupling a pulse 19*a* of energy to the multivibrator 20. The values of the component parts in this circuit 18 are selected in such a manner as to constitute a self-oscillating circuit which will bias itself to cut-off or non-oscillating condition. In this condition the circuit 18 may be discharged or made conductive by impressing a positive potential on the terminal 33 of sufficient value to drive the grid 29 sufficiently positive to cause the circuit to oscillate, and when this occurs, the pulse produced by this oscillation is coupled through to the multivibrator by the capacitor 19*b*. Of course, other circuit arrangements may be used for this comparison circuit 18 without departing from the scope or spirit of this invention.

Referring again to the operation of this comparator circuit, a positive source of D.C. reference potential connected to the terminal 37, and in turn the cathode 30, will effect a particular bias on the grid 29. Of course, this bias will determine the value of cycling voltage 17, coupled to the terminal 33 necessary to cause the generation of the pulse 19*a* fed to the multivibrator.

My improved memory circuit, shown in Fig. 6, is essentially a cathode follower type of circuit including a tube V–2 having an anode 38, two control grids 39 and 40, respectively, and a cathode 41. A capacitor 42 couples the cathode 41 to ground. A triode V–3 is bridged across the capacitor 42 with its anode 43 coupled to the cathode and its cathode 44 connected to ground. The control grid 45 is arranged to be coupled to the sweep input by-pass 27. Also, the anode 43 is arranged to to be connected to the sweep plates (horizontal or vertical) of the storage tube 1. A B+ source of potential is coupled to anode 38 through a resistor 46, and this anode is further coupled to ground through a capacitor 47. Grid 39 is adapted to be connected to the output 24 of the multivibrator, and grid 40 is coupled into the sweep terminator.

The sweep circuit 26 and the terminator 23 (shown in Fig. 8) may consist of the two shunt connected triodes V–4 and V–5. The tube V–4 serves the function of supplying the basic sweep voltage (curve D, Fig. 7), its anode 48 being connected to a source of B+ voltage and also ground through charging capacitor 49. To the control grid 50 is coupled a square wave pulse 51 by means of coupling capacitor 52, and bias voltage is supplied by resistor 53. The cathode 54 is connected to ground.

The sweep terminator circuit 23 has the anode 55 of tube V–5 connected to the anode 48 of tube V–4. The control grid 56 is connected by means of coupling capacitor 57 to the output 22 of the multivibrator 20. Resistor 58 supplies bias for the grid 56, and the cathode 59 is connected to ground.

The sweep circuit 26 operates in a conventional manner, the saw-tooth sweep potential being taken from across the charging capacitor 49. During idling conditions, the grid 50 is supplied with a potential which causes tube V–4 to conduct. Thus a relatively low potential appears across this tube. However the moment a suitable square wave negative pulse 51 (from any suitable conventional source such as a one-shot multivibrator) is impressed upon the grid, the grid cuts off and the tube V–4 is made non-conductive. The resistance of the tube becomes very high and capacitor 49 is charged through the plate load resistor from B+. This capacitor charges, then, to the final value of the anode potential along a curve delineated by a saw-tooth configuration.

During the aforementioned idling and the early development of the saw-tooth wave of the sweep input 26, the terminator 23 is biased to cut off. However, by timing the multivibrator pulse 22*a* so as to trigger V–5 to conduct prior to the capacitor 49 reaching full charge, the normal full amplitude of the saw-tooth wave may be reduced. This terminating action occurs the instant the leading edge of the pulse 22*a* causes tube V–5 to conduct thereby lowering the resistance of this tube and the anode potential on tube V–4. The normal full sweep amplitude over capacitor 49 will thereby be prematurely terminated producing a wave form of shorter sweep duration.

If the normal full sweep voltage is sufficient to just cover the horizontal sweep of storage screen 8, it is thus seen that a shortened sweep will serve to sweep something less than the total horizontal dimension of the screen.

Between pulses from the multivibrator fed into the grid 39 of the memory circuit 25 (see Fig. 6), the sweep voltage applied to grid 40 will cause the tube V–2 to conduct in accordance therewith. A charge will appear on condenser 42 in exact conformity with this sweep voltage, providing, of course, there is no conduction between the anode 43 and cathode 44 of the triode V–3. Now, if a negative pulse is fed to the grid 39, tube V–2 will be cut off thereby stabilizing the charge appearing on capacitor 42 to a single value, and the wave form fed to the sweep plates of the storage tube 1 will appear as curve E of Fig. 7. The capacitor 42 may be discharged after a predetermined lapse of time by impressing a suitable pulse of voltage onto the grid 45 causing the tube V–3 to discharge the capacitor 42. This pulse of discharge voltage 27 may be derived from the sweep input generator as indicated in Fig. 4.

In order to locate a point of information on the storage screen 8, it is necessary to use two circuits such as the one illustrated in Fig. 4. One of the circuits will control horizontal deflection of the electron beam in the storage tube 1, and the other circuit will control the vertical deflection.

Now assuming that the item of information desired to be read lies three spaces or islands to the right of the left hand edge of the storage screen 8 and four elements down from the top edge of the screen, the reference or position-information voltages (19) for the vertical and horizontal position control circuits are set at values previously calibrated to locate the beam at the coordinates of the information location. The beam is now started on its course of deflection as represented by the curve D of Fig. 7, by the saw-tooth sweep of sweep circuit 26. As the beam sweeps, for example, horizontally from left to right, it will pass over the islands 13 (Fig. 2), and conductive areas 14. Each time the beam impinges a conductive area, a pulse of voltage 60 (Fig. 4) will be produced over the resistor 15. Thus, in moving across the three spaces to arrive at the third island, three pulses 60 will be produced. These three pulses will be fed into the linear counter 16 which produces a stepped parameter voltage output having a magnitude corresponding to the three pulses. This stepped output is fed into the terminals 33 (Fig. 5) of the comparator circuit.

It is of course the object to stop this horizontal sweep on the third island over, and for this purpose the control reference voltage 19 (position information voltage) having a calibrated magnitude corresponding to the three spaces, is coupled to terminal 37 of the comparator circuit 18. As explained above, this reference voltage will control cycling of the comparator circuit in response to the stepped output voltage of the linear counter 16, and by proper calibration, a particular value of reference voltage will correspond to a particular number of spaces.

Figure 7:
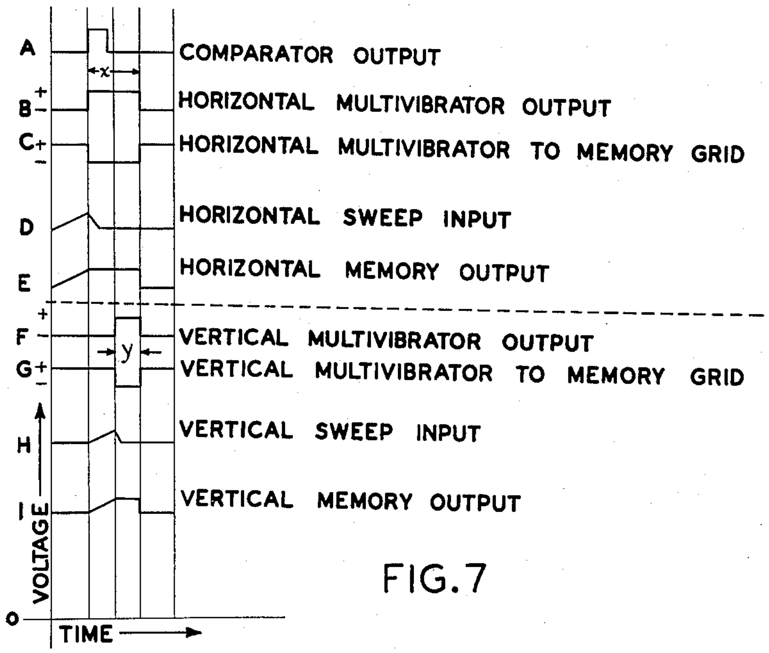
Fig. 7 is a series of graphs of voltage wave forms taken across different points in the circuit of Fig. 4.

When the pre-set reference voltage 19 is matched by the corresponding number of pulses 60, the comparator 18 produces a pulse 19*a* which is used to trigger the multivibrator 20 which in turn produces a gating pulse output 22*a* of width X as seen in graph B of Fig. 7. This pulse 22*a* and the sweep voltage (graph D, Fig. 7) of the sweep generator 26 are fed into the sweep terminator 23, and the latter is so arranged that the leading edge of the pulse 22*a* selectively terminates the sweep and thereby causes the beam to stop on the pre-selected area of information.

The terminated sweep voltage is then fed from the sweep terminator 23 into grid 40 of the memory circuit of Fig. 6. As explained previously, a charge will be developed on storage capacitor 42 (Fig. 6) corresponding to the terminated value of sweep.

The multivibrator 20 is also arranged to produce a negative gating pulse 22*b* (graph C, Fig. 7) in timed conformity with the positive pulse (graph B) fed to sweep terminator 23, which inhibits the conduction of the memory circuit 25. This period of inhibited conduction will continue for the duration of this negative pulse which is of sufficient length to provide locating the beam on its horizontal sweep and make the reading step to follow subsequently. The output of memory circuit 25 which is fed to the sweep plates will then correspond to the wave form shown in graph E. Since the upper limit of the sweep pulse is maintained constant for a length of time corresponding to the width "X" of the multivibrator pulse, it is seen that the beam on its horizontal sweep will be stopped and held in this position.

The horizontal coordinate of the location of the item of information sought now having been located, the next step in the location process is to move the beam a distance vertically corresponding to the vertical coordinate of four spaces. For this vertical deflection, a circuit substantially identical to the one previously described for the horizontal sweep is used, its function being graphically illustrated by the curves F, G, H and I of Fig. 7. With the operation of the vertical sweep circuit, the beam is accurately located on the exact element desired to be read, and the horizontal and vertical multivibrator output pulses need only be of such widths as are necessary to complete the reading step, which may be of few micro-seconds in duration. Once the information has been "read," a suitable positive pulse is derived from the sweep input circuit 26 and fed into the triode section V–3 of the memory circuit 25 for discharging the capacitor 42. Likewise, a reset pulse is derived from the multivibrator 20 and fed into the linear counter 16 for destroying the stepped output pulse to ready the counter for another "reading" cycle.

In the use of the present invention, it is possible to make computations from information previously written on the storage screen 8. Obviously, by the use of this invention, the time required in obtaining a series of readings from different islands of information is extremely short, thereby conducing to a decided advantage, timewise, in comparison with mechanical computing devices in current use.

What is claimed is:

1. A memory circuit network comprising a first circuit arranged to produce a pulse having a given parameter, a sweep voltage source, a terminating circuit coupled to said source and to said first circuit and operative to limit the magnitude of said sweep voltage at the instant said pulse occurs, and a storage circuit coupled to said terminating circuit to receive the aforementioned sweep voltage of limited magnitude, said storage circuit including a storage capacitor which is connected to a variable conduction device, said capacitor assuming a variable charge which conforms to the wave form of said sweep voltage of limited magnitude and said variable conduction device being operative to interrupt the wave form of the conforming charge developed over said capacitor.

2. A memory circuit comprising a first circuit arranged to produce a pulse of energy of given magnitude and duration, a sweep voltage source, a terminating circuit coupled to said source and to said first circuit and operative to limit the magnitude of said sweep voltage at the instant said pulse energy occurs, and a storage circuit coupled to said terminating circuit to receive said limited sweep voltage, said storage circuit including an electron discharge device having an anode, a cathode, two grids and a storage capacitor coupled to said cathode, one of said grids being coupled to said terminating circuit for receiving said sweep voltage and for varying the conductance of said device responsive thereto, and the other of said grids being operatively coupled to said first circuit for terminating the conductance of said device responsive to the generation of the pulse of said first circuit, said storage circuit normally conducting a space current from said anode to said cathode and impressing a charge on said capacitor which conforms to the waveform of said limited sweep voltage but serving to interrupt such conformity when said other grid senses the generation of said first circuit pulse.

3. A memory circuit network comprising a circuit arranged to produce a square voltage pulse having a predetermined length, a sweep voltage generator, a terminating circuit coupled to said sweep voltage generator and to said pulse producing circuit and arranged to limit the amplitude of said sweep voltage and to maintain said sweep voltage at its limited value responsive to the leading edge of said square pulse, and a storage circuit including an electron discharge device having an anode, a cathode, and two grids, a storage capacitor coupled to said electron discharge device cathode, one of said grids being coupled to said terminating circuit for receiving said limited amplitude sweep voltage for varying the conductance of said device responsive thereto, said capacitor assuming a charge responsive to said limited amplitude sweep voltage, the other of said grids being coupled to said pulse producing circuit and operative to cut-off conduction of said electron discharge device responsive to initiation of said pulse, and another electron discharge device having an anode and cathode connected across said capacitor and having a control grid coupled to said sweep voltage generator for discharging said capacitor after a predetermined time.

4. An electron memory device comprising an electron discharge device having an anode, a cathode and two control grids, a storage capacitor only directly coupled between said cathode and ground potential, means coupled to one of said control grids for supplying thereto a sweep voltage which is conformingly conducted between the anode and cathode of said electron discharge device thereby producing a charge on said capacitor conforming to said sweep voltage, means coupled to the other of said control grids for supplying a voltage thereto adapted to cut-off the conduction of said electron discharge device and thereby to fix the charge on said capacitor, and another electron discharge device having an anode, a cathode and a control grid, said anode and cathode of said other electron discharge device being coupled across said capacitor, and means coupled to the control grid of said other electron discharge device for supplying a signal thereto to cause conduction thereof thereby to discharge said capacitor.

5. A memory circuit network comprising: a circuit arranged to produce a voltage pulse having a given parameter; a sweep voltage generating circuit including a first electron discharge device having a cathode, an anode and a control grid, said control grid being coupled to a source of sweep voltage timing pulses, and a capacitor coupled between the anode of said first electron discharge device and ground potential; a sweep voltage terminating circuit including a second electron discharge device having a cathode, an anode, and a control grid, the anode of said second electron discharge device being coupled to said first electron discharge device anode, the control grid of said second electron discharge device being coupled to said pulse producing circuit whereby the leading edge of said pulses limits said sweep voltage and maintains the amplitude thereof at a predetermined value; and a storage circuit including a third electron discharge device having an anode, a cathode and two control grids, a storage capacitor only directly coupled between said third electron discharge device cathode and ground potential, one of said third electron discharge device control grids being coupled to said first and second electron discharge device anodes thereby to receive said limited amplitude sweep voltage for varying the conductance of said third device responsive thereto, said capacitor having a charge impressed thereon conforming to said predetermined amplitude voltage, said other control grid of said third electron discharge device being coupled to said pulse producing circuit and being operative to cut-off conduction of said third electron discharge device responsive to initiation of said pulse.

References Cited in the file of this patent

UNITED STATES PATENTS

| | | |
|---|---|---|
| 2,554,172 | Custin | May 22, 1951 |
| 2,688,742 | Sweer | Sept. 7, 1954 |